Patented Dec. 7, 1948

2,455,896

UNITED STATES PATENT OFFICE 2,455,896

1-ARYL, 5-ALKYL, BIGUANIDES

Daniel E. Nagy, Stamford, Conn., assignor to American Cyanamid Company, New York, N. Y., a corporation of Maine No Drawing. Application October 12, 1945, Serial No. 622,075

2 Claims. (Cl. 260—565)

This invention relates to substituted biguanides and a method for their preparation.

The substituted biguanides which may be prepared by the method of the present invention may be represented by the formula

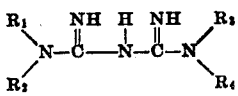

where $R_1$ and $R_3$ are chosen from a member of the group consisting of aliphatic, aromatic, and heterocyclic radicals, and where $R_2$ and $R_4$ are chosen from a member of the group consisting of hydrogen, aliphatic, aromatic, and heterocylic radicals. In the preparation of these biguanides according to the method of the present invention, it is contemplated that $R_1$ and $R_3$ may or may not be the same organic radical; that $R_2$ and $R_4$ may or may not be the same; and that $R_1$, $R_2$, $R_3$, and $R_4$ may be identical or not as restricted by the above definitions. These substituent radicals may be saturated or unsaturated.

In the present invention, the substituted biguanides may be prepared by the reaction of an amine of the formula

where $R_3$ and $R_4$ have the meanings above given, with a substituted 3-cyanoguanidine of the formula

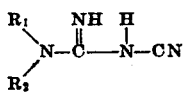

where $R_1$ and $R_2$ have the meanings above given, as shown in Equation 1 in which the R's have the meanings above given.

(1)
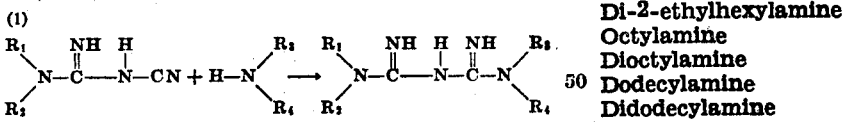

The same substituted biguanide obtained by the reaction shown in Equation 1, may also be obtained by the reaction shown in Equation 2.

(2)
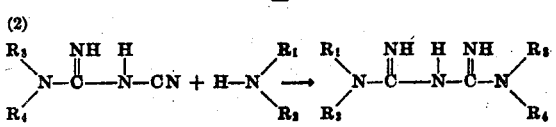

where the R's have the meanings above given.

The present invention also contemplates that the substituted biguanides may be prepared by the reaction of a primary or secondary amine salt with a substituted 3-cyanoguanidine. In many instances it is more convenient and often preferred that an amine salt be used in its reaction with the substituted 3-cyanoguanidine. The mechanism and reaction is substantially the same as that shown in Equations 1 and 2, with the exception that a substituted biguanide salt is formed instead of the free base. The presence of the salt often facilitates the isolation and recovery of the substituted biguanide because many of the free bases are not easily crystallized and/or distilled.

In preparing the compounds of the present invention, the primary and secondary amines which can be used in the preparation of substituted biguanides may be aliphatic, aromatic, and heterocyclic, and may be saturated and unsaturated. These types of amines may have various substituents on the organic radicals in addition to the reactive amino group. Amines typical of those capable of undergoing the reaction of the present invention are as follows:

*Aliphatic amines*

Methylamine
Dimethylamine
Ethylamine
Diethylamine
Propylamine
Dipropylamine
Isopropylamine
Diisopropylamine
Butylamine
Dibutylamine
Hexylamine
Dihexylamine
2-ethylhexylamine
Di-2-ethylhexylamine
Octylamine
Dioctylamine
Dodecylamine
Didodecylamine
Octadecylamine
Dioctadecylamine
Allylamine
Diallylamine Octadecenylamine
β-Sulfoethylamine
δ-Sulfopropylamine
Ethylenediamine
Propylenediamine
Tetramethylenediamine
Hexamethylenediamine
Decamethylenediamine
Diethylenetriamine
Triethylenetetramine
Tetraethylenepentamine
Cyclohexylamine
Dicyclohexylamine
Cyclopentylamine
Benzylamine
Dibenzylamine
β-Phenylethylamine
Naphthylmethylamine
Glycine
β-Alanine
Aminobutyric acid

Aromatic amines

| | |
|---|---|
| Aniline | Methylnaphthylamines |
| α-Naphthylamine | |
| β-Naphthylamine | Aminoethylbenzenes |
| o-Aminodiphenyl | Phenylenediamines |
| Sulfanilic acid | Naphthylenediamines |
| Sulfanilamide | Aminobenzoic acids |
| 2-sulfanilamidopyrimidine | Ethyl aminobenzoates |
| | Aminobenzamides |
| Sulfanilylguanidine | Phenylglycines |
| 2-sulfanilamidopyrazine | Aminophenylglycines |
| 2-sulfanilamidopyridine | Aminobenzaldehydes |
| 2-sulfanilamidothiazole | Ethylaniline |
| Aminonaphthalenesulfonic acid | Methylaniline |
| | Chloroanilines |
| Aminotoluenesulfonic acid | Bromoanilines |
| | Nitroanilines |
| Aminophenols | Anisidines |
| Aminonaphthols | Diaminophenols |
| Methylaminophenols | Diaminonaphthols |
| Aminothiophenols | Diaminodiphenylmethanes |
| Toluidines | |
| Xylidines | |

Heterocyclic amines

| | |
|---|---|
| Piperidine | Piperazine |
| Aminopyridine | Amino-1,2-diazole |
| Morpholine | Amino-1,3-diazole |
| Thiomorpholine | Amino-1,2,3-triazole |
| Pyrroline | Amino-1,2,4-triazole |
| Pyrrolidine | Furfurylamine |

These amines and their salts are typical of those which react with a substituted 3-cyanoguanidine to form a substituted biguanide. It is to be understood that these amines may be substituted by various organic radicals, groups, or elements which do not prohibit the reaction with substituted 3-cyanoguanidine. Numerous substituents have already been illustrated in the above list of amines.

The reaction of the present invention may be run with or without either a solvent and/or a diluent or it may be run by the fusion of the reactants. The temperature range in which this reaction usually takes place is approximately 80°–150° C. However, the preferred temperature range for this reaction is approximately 90°–130° C.

If an amine salt is used as a source of amine for the reaction of the present invention, the use of common salts such as hydrochloride, sulfate, and acetate is preferred. Any salt from which the amine may be liberated is suitable for this reaction.

The 3-cyanoguanidines which are used as a reagent in this invention are prepared by the reaction of an amine of the formula

where $R_1$ and $R_2$ have the meanings above given, with dicyanimide. The general reaction is given by Equation 3 in which the R's have the meanings above given.

(3) 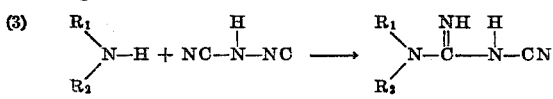

The 3-cyanoguanidines may also be prepared by the reaction of a primary or secondary amine salt with a dicyanimide salt. The reaction of these materials involve the formation of an in- organic salt and the simultaneous liberation of both the free amine and the free dicyanimide which then react according to Equation 3. The over-all reaction of the aforementioned amine and dicyanimide salts to produce a substituted 3-cyanoguanidine is shown in Equation 4, (4) 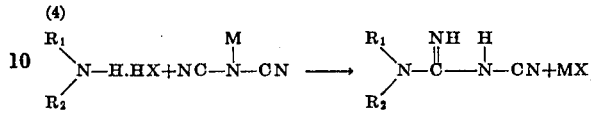

where the R's have the meanings above given, M is an ion of a metallic element, and X is the anion portion of an acid. In actual practice it is preferred to prepare the substituted 3-cyanoguanidines by the reaction of a primary or secondary amine salt with a dicyanimide salt, which is the form in which the dicyanimide is usually prepared, recovered, and stored.

Substituted 3-cyanoguanidines of the formula

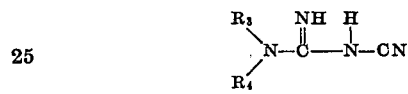

where $R_3$ and $R_4$ have the meanings above given, may be prepared according to the reactions of Equations 3 and 4 by using the appropriate amine and/or amine salt.

The primary and secondary amines which may be used in the preparation of substituted 3-cyanoguanidines may be aliphatic, aromatic, and heterocyclic. These types of amines may have various substituents on the organic radical in addition to the active amino group. The substituents must not be those which prohibit the reaction of an amine with a dicyanimide. Amines typical of those capable of undergoing the reaction with a dicyanimide have already been presented earlier in this specification.

Substituted 3-cyanoguanidines may be prepared with or without either a solvent and/or a diluent or they may be prepared by the fusion of the reactants. The temperature range in which this reaction takes place is approximately 50°–125° C. However, the preferred temperature range for this reaction is approximately 75°–115° C.

If the preparation of substituted 3-cyanoguanidines is carried out using a metal salt of dicyanimide, it is to be understood that any metal salt from which the dicyanimide may be liberated may be used. However, it is preferred that the calcium, sodium, and potassium salts of dicyanimide be used because these are the most inexpensive and most easily prepared suitable salts of dicyanimide.

If an amine salt is used as a source amine in this reaction, the use of common salts such as the hydrochloride, sulfate, and acetate is preferred. Any salt from which the amine may be liberated is suitable for this reaction.

An example which is typical of the methods used in the preparation of substituted 3-cyanoguanidines is given below.

EXAMPLE 1

*1-cyclohexyl-3-cyanoguanidine*

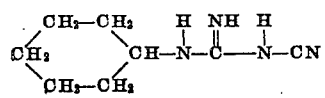

(A)

| Reagents | Molar Ratio |
| --- | --- |
| Calcium dicyanimide | 0.5 |
| Cyclohexylamine hydrochloride | 1.0 |
| Water | 35.0 |

These reagents are dissolved in the water and the pH is adjusted to 7.0–7.5 with a small amount of hydrochloric acid. This reaction mixture is then heated in a reaction vessel equipped with a reflux condenser for about 24 hours at 95°–100° C. During the reaction, an oil separates but no ammonia is liberated. When this oil is dissolved in an aqueous ethanol medium, crude 1-cyclohexyl-3-cyanoguanidine, which melts at 145°–150° C., is recovered thereform. This material may be further purified by recrystallization from aqueous ethanol to yield crystalline material melting at 158°–160° C.

(B)

| Reagents | Molar Ratio |
| --- | --- |
| Sodium dicyanimide | 1.0 |
| Cyclohexylamine hydrochloride | 1.0 |
| Isopropanol | 16.5 |

A mixture of the above components is refluxed about four hours. The sodium dicyanimide is not very soluble in the isopropanol, so that it is difficult to distinguish between it and the sodium chloride which separates as the former reacts. The resultant reaction mixture is cooled and the sodium chloride removed thereform. After evaporating the isopropanol solution, a gummy residue is obtained which is purified by dissolution in aqueous ethanol. 1-cyclohexyl-3-cyanoguanidine crystallizes from this solution, and after recovery and drying, it melts at 155° C. Further purification raises the melting point to 158°–159° C. The sodium chloride need not be removed by filtration, but may be leached with water from the residue obtained after the evaporation of the isopropanol.

(C)

| Reagents | Molar Ratio |
| --- | --- |
| Sodium dicyanimide | 1.0 |
| Cyclohexylamine hydrochloride | 1.0 |

The dry salts are mixed in an open vessel and the temperature is raised to substantially 90° C. where a gummy material forms. The temperature is raised further to substantially 100° C. and maintained there for about an hour. No exothermic reaction is noted nor is any ammonia liberated. After this reaction mixture is cooled, the sodium chloride is leached therefrom with water, and the residue is recrystallized from aqueous ethanol to yield 1-cyclohexyl-3-cyanoguanidine melting at 158°–160° C.

(D)

| Reagents | Molar Ratio |
| --- | --- |
| Sodium dicyanimide | 1.0 |
| Cyclohexylamine hydrochloride | 0.9 |
| Water | 5.5 |

The above mixture is heated at substantially 100° C. for about seven and one-half hours. Two liquid phases are present after about three hours of the heating. The oil which separates becomes a gummy material at the completion of the reaction, and this material, after recovery and recrystallization from aqueous ethanol, yields 1-cyclohexyl-3-cyanoguanidine melting at 158°–159° C.

The metal salts of dicyanimide may be prepared by the reaction of cyanogen chloride with an aqueous slurry and/or solution of a metal salt of cyanamide in a temperature range of substantially 0°–50° C. These salts may be used in solution without isolating them from the reaction mixture obtained above.

The preparation of an aqueous solution containing calcium dicyanimide is included in the following example as typical of the preparation of dicyanimide salts suitable for reaction with amines to yield substituted 3-cyanoguanidines and/or substituted biguanides.

EXAMPLE 2

| Reagents | Molar Ratio |
| --- | --- |
| Cyanogen chloride | 1.0 |
| Crude calcium cyanamide (61%) | 1.1 |
| Water | 13.9 |

The thick calcium cyanamide slurry is stirred about ten minutes prior to the addition of cyanogen chloride. This treatment serves to wet thoroughly the calcium cyanamide particles so that a satisfactory reaction with cyanogen chloride may be had. The cyanogen chloride is added at a temperature range of 24°–26° C., and at a rate of substantially one mol per hour. When the reaction is completed, as indicated by the spontaneous drop in temperature of a couple of degrees, the mixture is filtered to remove insoluble materials. This clear filtrate may be used without attempting to recover crystalline calcium dicyanimide therefrom.

By slight modifications of this process it is possible to prepare both the sodium and potassium dicyanimide salts.

The present invention further contemplates the novel series of substituted biguanides represented by the formula

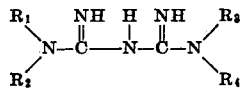

where $R_3$ is chosen from a member of the group consisting of aromatic, heterocyclic, and aliphatic radicals, $R_1$ is chosen from a member of the group consisting of aromatic, heterocyclic, and aliphatic radicals, the latter aliphatic radical being different from $R_3$, and $R_2$ and $R_4$ have the meanings already given in connection with the method of the present invention.

In particular, the present invention further contemplates the novel series of substituted biguanides represented by the formula

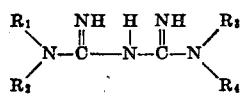

where $R_1$ is chosen from a member of the group consisting of aromatic and heterocyclic radicals, $R_3$ is chosen from a member of the group consisting of aliphatic, aromatic, and heterocyclic radicals, and $R_2$ and $R_4$ are chosen from a member of the group consisting of hydrogen, aliphatic, aromatic, and heterocyclic radicals. These substituent radicals may be saturated or unsaturated.

The examples which follow show the preparation of typical substituted biguanides.

EXAMPLE 3

1,5-diphenylbiguanide

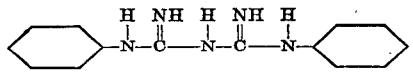

(A)

| Reagents | Molar Ratio |
| --- | --- |
| 1-Phenyl-3-cyanoguanidine | 1.0 |
| Aniline | 1.0 |
| Hydrochloric acid, conc | 1.0 |
| Water | 48.0 |

An agitated mixture of aniline and 1-phenyl-3-cyanoguanidine in about 80% to 90% of the above amount of water is heated to about 90° C. The hydrochloric acid is diluted with the remaining 10% to 20% of the water and this solution is carefully added to the hot reaction mixture. After the addition of the dilute acid is completed, the reaction mixture is heated to refluxing. The refluxing is maintained for about 30–60 minutes during which time a clear solution is formed. The solution is cooled and 1,5-diphenylbiguanide hydrochloride crystallizes. This material is filtered, washed, and dried. 1,5-diphenylbiguanide hydrochloride melts at 223°–225° C. The free base may be obtained by treating the hydrochloride salt with substantially a stoichiometric amount of 10% to 20% aqueous sodium hydroxide. The resulting insoluble precipitate is recovered, washed, and dried. 1,5-diphenylbiguanide melts at 148°–149° C.

(B)

| Reagents | Molar Ratio |
| --- | --- |
| Calcium dicyanimide | 0.45 |
| Aniline | 1.0 |
| Hydrochloric acid, conc | 1.0 |
| Water | 24.0 |

One-half of the above amount of aniline is added to a solution of calcium dicyanimide in about two-thirds of the above amount of water. The hydrochloric acid is diluted with the remaining amount of water, and this solution is slowly added at substantially 80° C. to the agitated mixture containing aniline and calcium dicyanimide. When approximately one-half of the hydrochloric acid is added, the remainder of the aniline is added. The temperature is raised to substantially 100° C., and the remaining acid is carefully added. Crystals of 1,5-diphenylbiguanide hydrochloride separate soon after the addition of the hydrochloric acid is completed. The reaction mixture is heated an additional 30–60 minutes, then cooled and filtered. The crystals are washed with cold water and air-dried. 1,5-diphenylbiguanide hydrochloride melts at 223°–225° C. The free base may be obtained by treating the hydrochloride salt with substantially a stoichiometric amount of 10%–20% aqueous sodium hydroxide. The resulting insoluble precipitate is recovered, washed, and dried. 1,5-diphenylbiguanide melts at 148°–149° C.

EXAMPLE 4

1-phenyl-5-p-sulfophenylbiguanide

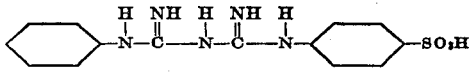

| Reagents | Molar Ratio |
| --- | --- |
| 1-Phenyl-3-cyanoguanidine | 1.0 |
| Sulfanilic acid | 1.0 |
| Water | 70.0 |

The aqueous mixture of the above reagents is stirred and heated to refluxing for 30–60 minutes. The reaction mixture becomes clear after 15–20 minutes, then crystalline 1-phenyl-5-p-sulfophenylbiguanide soon starts to precipitate. After the reaction mixture is cooled the colorless solid is recovered, washed with water, and air dried. 1-phenyl-5-p-sulfophenylbiguanide melts at 284°–285° C. 1-phenyl-5-p-sulfophenylbiguanide may also be prepared by the reaction of 1-p-sulfophenyl-3-cyanoguanidine with aniline.

EXAMPLE 5

1,1'-diphenyl-bis-5,5'-p-phenylenebiguanide

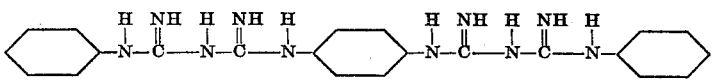

| Reagents | Molar Ratio |
| --- | --- |
| 1-Phenyl-3-cyanoguanidine | 1.0 |
| p-Phenylenediamine | 0.5 |
| Hydrochloric acid, conc | 1.0 |
| Water | 60.0 |

The agitated mixture of p-phenylenediamine and 1-phenyl-3-cyanoguanidine in about 80%–90% of the above amount of water is heated to substantially 100° C. The hydrochloric acid is diluted with the remainder of the above amount of water, and added slowly to the reaction mixture so that a pH of about 3.0 is obtained at the end of the reaction. This reaction mixture is heated about an hour at substantially 100° C., and it is treated with decolorizing charcoal during approximately the last quarter hour of the heating. After the decolorizing charcoal is removed, the solution is cooled so that 1,1'-diphenyl-bis-5,5'-p-phenylenebiguanide dihydrochloride crystallizes. This solid is recovered, washed with cold water and acetone, and air dried. 1,1'-Diphenyl-bis-5,5'-p-phenylenebiguanide dihydrochloride melts at 235° C. after crystallization from water. The free base is obtained by treating the hydrochloride salt with substantially a stoichiometric amount of sodium hydroxide. This 1,1'-diphenyl-bis-5,5'-p-phenylenebiguanide melts at 219°–220° C. It is insoluble in cold acetone, methyl alcohol, water, and dilute sulfuric acid. It is soluble in glacial acetic acid, dilute acetic acid, and dilute hydrochloric acid.

EXAMPLE 6

1-butyl-5-octylbiguanide

| Reagents | Molar Ratio |
|---|---|
| 1-Octyl-3-cyanoguanidine | 1.0 |
| Butylamine hydrochloride | 1.1 |

These two materials are mixed and stirred mechanically for about 3–4 hours at substantially 130°–135° C. The mixture becomes homogeneous, and does not exhibit strong exothermic characteristics. After the reaction mixture is cooled, the crude 1-butyl-5-octylbiguanide hydrochloride is dissolved in water to form a thin jelly-like opalescent solution. This solution is treated with an excess of sodium sulfate over the theoretical amount required, and the insoluble 1-butyl-5-octylbiguanide sulfate precipitates. The crude salt is recovered and washed with acetone. It is recrystallized from isopropanol containing a small amount of water, and after recovery 1-butyl-5-octylbiguanide sulfate melts at 212°–214° C. The free base, 1-butyl-5-octylbiguanide, may be obtained by treatment of the sulfate salt with a stoichiometric amount of alkali. It is a gum at room temperature. The hydrochloride salt may be prepared by adding HCl to the free base, and after recovery it is a waxy solid quite soluble in water.

1-Butyl-5-octylbiguanide may also be prepared in a similar manner by the reaction of 1-butyl-3-cyanoguanidine with octylamine.

EXAMPLE 7

*1-dodecyl-5-ethylbiguanide*

| Reagents | Molar Ratio |
|---|---|
| 1-Dodecyl-3-cyanoguanidine | 1.0 |
| Ethylamine hydrochloride | 0.9 |

The above two reagents are heated for about 4 hours at a temperature of substantially 125°–130° C. After the reaction mixture is cooled, the resultant crude 1-dodecyl-5-ethylbiguanide hydrochloride is dissolved in water. The resulting aqueous solution is treated with an excess of sodium sulfate over the theoretical amount required, and insoluble 1-dodecyl-5-ethylbiguanide sulfate precipitates. After recovery and recrystallization from isopropanol containing a small amount of water, 1-dodecyl-5-ethylbiguanide sulfate sinters at 190° C. and melts at 213°–214° C. The free base is a waxy solid obtained by treating the sulfate salt with substantially a stoichiometric amount of sodium hydroxide. The hydrochloride salt which is obtained by the acidification of the free base with HCl, is also a waxy solid which gives a foamy turbid solution in water.

1-dodecyl-5-ethylbiguanide may also be prepared in a similar manner by the reaction of 1-ethyl-3-cyanoguanidine with dodecylamine.

EXAMPLE 8

*1-butyl-5-phenylbiguanide*

(A)

| Reagents | Molar Ratio |
|---|---|
| 1-Butyl-3-cyanoguanidine | 1.0 |
| Aniline | 1.0 |
| Hydrochloric acid, 10% | 1.0 |

The above three reagents are carefully mixed and agitated while heated at substantially 90° C. for about two hours. After this reaction mixture is cooled 1-butyl-5-phenylbiguanide hydrochloride crystallizes from solution. This solid is recovered, washed, and dried, and after recrystallization from water it melts at 210°–211° C. The free base is prepared by the addition of substantially a stoichiometric amount of alkali, and after removal of the sodium chloride, 1-butyl-5-phenylbiguanide is a non-crystallizable gum. The nitrate salt may be prepared from the free base by the addition of substantially a stoichiometric amount of nitric acid. It melts at 152°–154° C.

(B)

| Reagents | Molar Ratio |
|---|---|
| 1-Phenyl-3-cyanoguanidine | 1.0 |
| Butylamine hydrochloride | 1.0 |
| 2-Ethoxyethanol-1 | 0.6 |

The mixture of the above three reagents is heated at substantially 130°–140° C. for 3–4 hours. After the reaction mixture is cooled it is extracted with water at room temperature. The aqueous extract is made alkaline and crude gummy 1-butyl-5-phenylbiguanide is precipitated. This free base is transformed to the hydrochloride salt and recrystallized to yield 1-butyl-5-phenylbiguanide hydrochloride melting at 210°–211° C.

EXAMPLE 9

*1-cyclohexyl-5-p-sulfophenylbiguanide*

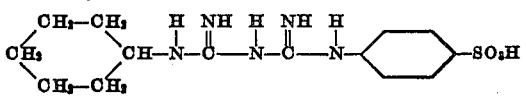

| Reagents | Molar Ratio |
|---|---|
| 1-Cyclohexyl-3-cyanoguanidine | 1.0 |
| Sulfanilic acid | 1.0 |
| Water | 42.0 |

The aqueous mixture of the above reagents is agitated and heated to refluxing for 2–3 hours. A clear solution is first obtained, then an oil separates which later solidifies. After the reaction is cooled this solid, crude 1-cyclohexyl-5-p-sulfophenylbiguanide is recovered. This solid is purified by dissolving it in dilute aqueous alkali then reprecipitating it by the addition of acid. A repetition of this purification procedure in alcohol yields crystalline 1-cyclohexyl-5-p-sulfophenylbiguanide which, after recovery and drying, melts at 258°–259° C.

1-cyclohexyl-5-sulfophenylbiguanide may also be prepared by the reaction of 1-p-sulfophenyl 3-cyanoguanidine with cyclohexylamine following substantially the same procedure as outlined in Example 8B.

EXAMPLE 10

*1-dodecyl-5-phenylbiguanide*

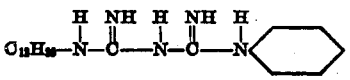

| Reagents | Molar Ratio |
|---|---|
| 1-Dodecyl-3-cyanoguanidine | 1.00 |
| Aniline | 1.02 |
| Hydrochloric acid, 10% | 1.02 |
| Ethanol | 1.30 |

This mixture is heated at approximately 90° C. for about 3.5 hours. The resultant clear solution is diluted with water, and after the alcohol is removed by distillation, a gel-like residue is obtained. This residue is diluted with a large excess of water and the resulting solution is filtered while it is still hot. After cooling the filtrate 1-diodecyl-5-phenylbiguanide hydrochloride crystallizes. This solid is recovered, washed, and dried and it melts at 173°–174° C.

1-dodecyl-5-phenylbiguanide may also be prepared by the reaction of 1-phenyl-3-cyanoguanidine with dodecylamine as described in Example 8B.

EXAMPLE 11

*1-dodecyl-5-p-sulfophenylbiguanide*

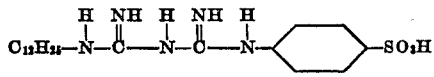

| Reagents | Molar Ratio |
|---|---|
| 1-Dodecyl-3-cyanoguanidine | 1.00 |
| Sulfanilic acid | 1.04 |
| Water | 100.00 |
| 2-Ethoxyethanol-1 | 3.10 |

The above reagents are mixed, agitated, and heated at substantially 100° C. for about 5 hours. After about 2 hours the sulfanilic acid is completely dissolved, and a heavy oily material appears. Upon completion of the heating, this reaction mixture is cooled, and the oil solidifies to a waxy solid. The 1-diodecyl-5-p-sulfophenylbiguanide is recovered, washed, and dried to yield a waxy solid which is soluble in alkali and also in ethanol. The addition of copper sulfate to an alkali solution of 1-dodecyl-5-p-sulfophenylbiguanide results in the formation of a violet colored solution.

The 1-dodecyl-5-p-sulfophenylbiguanide may also be prepared by the reaction of 1-sulfophenyl-3-cyanoguanidine with dodecylamine as in Example 8B.

EXAMPLE 12

*1-dodecyl-5-p-sulfonamidophenylbiguanide*

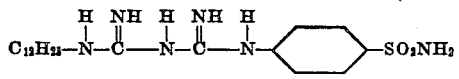

| Reagents | Molar Ratio |
|---|---|
| 1-Dodecyl-3-cyanoguanidine | 1.00 |
| Sulfanilamide | 1.05 |
| Hydrochloric acid, 10% | 1.00 |
| Ethanol | 4.30 |
| Water | 7.00 |

The mixture of 1-dodecyl-3-cyanoguanidine and sulfanilamide in the above alcohol and water is agitated and heated to 80°–90° C. The dilute hydrochloric acid is added slowly to this reaction mixture, and after this addition is completed, the clear reaction is stirred and refluxed for approximately an additional hour and one-half. The alcohol is then distilled and the clear solution is diluted with a large excess of water. This solution is treated with sufficient sodium chloride to salt out 1-dodecyl-5-p-sulfonamidophenylbiguanide hydrochloride. When warm, this mixture is a gummy solid but it becomes crystalline when cooled. The hydrochloride salt is recovered, washed, and dried, and it melts at 128°–130° C. The sulfate salt prepared from 1-dodecyl-5-p-sulfonamidophenylbiguanide hydrochloride by the addition of sodium sulfate, is insoluble in hot water and slightly soluble in acetone. The free base prepared from either of the above two salts is a gummy waxy material.

1-dodecyl-5-p-sulfonamidobiguanide may be prepared by the reaction of 1-p-sulfonamidophenyl-3-cyanoguanidine with dodecylamine as in Example 8B.

EXAMPLE 13

*1,1-dibutyl-5-phenylbiguanide*

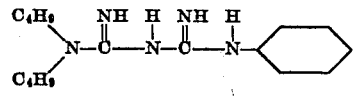

| Reagents | Molar Ratio |
|---|---|
| 1,1-Dibutyl-3-cyanoguanidine | 1.0 |
| Aniline | 1.0 |
| Hydrochloric acid, 10% | 1.1 |
| Water | 13.9 |
| Dioxane | 4.7 |

The dilute hydrochloric acid is added slowly to the agitated mixture of the 1,1-dibutyl-3-cyanoguanidine and aniline in aqueous dioxane while the temperature is maintained at 90°–100° C. The reaction mixture is heated about 1–2 hours, and during the latter portion of the heating period about 75%–80% of the aqueous dioxane is removed by distillation. The clear residual solution is diluted with additional water and cooled. Crude 1,1-dibutyl-5-phenylbiguanide hydrochloride forms as a gummy precipitate. This reaction mixture is treated with a slight excess of sodium hydroxide to form the free base, 1,1-dibutyl-5-phenylbiguanide, which is also a gummy material. The addition of substantially a stoichiometric amount of dilute sulfuric acid causes the neutral sulfate salt to form and crystallize. After it is recovered and dried, it is seen that the neutral sulfate salt is a hydrate which melts at 69°–71° C. and loses its water of hydration at 95°–105 C. at atmospheric pressure. 1,1-dibutyl-5-phenylbiguanide neutral sulfate is insoluble in water and acetone and soluble in methanol.

EXAMPLE 14

*Methylene-bis-(1,1'-p-phenylene-5,5'-octyl-biguanide)*

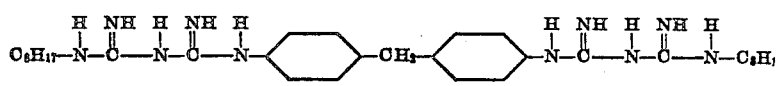

| Reagents | Molar Ratio |
|---|---|
| 1-Octyl-3-cyanoguanidine | 2.28 |
| 4,4'-Diaminodiphenylmethane | 1.00 |
| Hydrochloric acid, 13% | 2.00 |
| Water | 27.80 |
| Ethanol | 8.60 |

The dilute hydrochloric acid is carefully added to the refluxing aqueous alcoholic mixture of 1-octyl-3-cyanoguanide and 4,4'-diaminodiphenylmethane. The reaction mixture is heated for about 4 hours after which the bulk of the alcohol is removed by distillation. The residual clear solution is diluted with water and a gummy precipitate forms. This crude methylene-bis-(1,1'-p-phenylene-5,5' - octylbiguanide) dihydrochloride is gummy when first precipitated from the warm solution, but it crystallizes when cooled to substantially room temperature. This crude dihydrochloride is recovered, washed with water and acetone, and dried. The resulting dihydrochloride of methylene-bis-(1,1'-p-phenylene-5,5'-octylbiguanide) is transformed into the free base by treatment with excess alkali in methanolic water. The free base is a gummy material which on continued stirring in the cold solidifies. This solid is recovered, washed, and dried under vacuum to yield methylene-bis-(1,1'-p-phenylene-5,5'-octylbiguanide) which melts at 131°–133° C.

Example 15

*Methylene-bis-(1,1'-p-phenylene-5,5'-phenylbiguanide)*

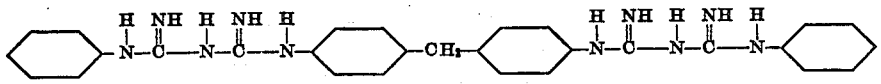

| Reagents | Molar Ratio |
|---|---|
| 1-Phenyl-3-cyanoguanidine | 2.18 |
| 4,4'-Diaminodiphenylmethane | 1.00 |
| Hydrochloric acid, 15% | 2.00 |
| Water | 55.00 |
| 2-Ethoxyethanol-1 | 3.40 |

The dilute hydrochloric acid is slowly added to the agitated mixture of 1-phenyl-3-cyanoguanidine and 4,4'-diaminodiphenylmethane in aqueous 2-ethoxyethanol-1 at approximately 100° C. The reaction mixture is heated about 2 hours, and towards the end of this heating period a crystalline precipitate of methylene-bis-(1,1'-p-phenylene-5,5'-phenylbiguanide) dihydrochloride starts to form. After the reaction is complete the reaction mixture is cooled and the crystalline dihydrochloride salt is recovered, washed with water, and dried. After recrystallization from water methylene - bis - (1,1'-p-phenylene-5,5'-phenylbiguanide) dihydrochloride melts at 249°–251° C. The free base is prepared by suspending the dihydrochloride salt in methanolic water and treating with a slight excess of sodium hydroxide over the stoichiometric amount required. The resulting insoluble methylene-bis-(1,1'-p-phenylene - 5,5'-phenylbiguanide) melts at 205°–206° C. It is not very soluble in water or alcohols.

Example 16

*Poly [methylene-bis-(1,1'-p-phenylene-5,5'-decamethylenebiguanide)]*

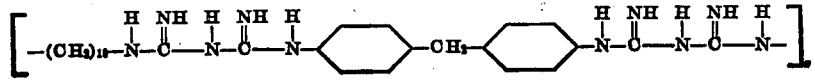

| Reagents | Molar Ratio |
|---|---|
| 1,1'-Decamethylene-bis-3,3'-cyanoguanidine | 1.0 |
| 4,4'-Diaminodiphenylmethane | 1.0 |
| Hydrochloric acid, 10% | 2.0 |
| Water | 18.5 |
| Ethanol | 17.0 |

The dilute hydrochloric acid is slowly added to an agitated refluxing mixture of 1,1'-decamethylene-bis-3,3'-cyanoguanidine and 4,4'-diaminodiphenylmethane in aqueous ethanol. After the addition of the dilute acid is completed, a clear solution is obtained. The alcohol is then removed by distillation, and the temperature is slowly raised to 90°–100° C. and maintained there for about 4 hours. At the end of this time the reaction mixture is somewhat gelatinous, and it is diluted with a large volume of water so that a clear solution is obtained. The hydrochloride salt of the poly [methylene-bis-(1,1'-p-phenylene-5,5'-decamethylenebiguanide)] is precipitated from the cold reaction mixture by the addition of a concentrated salt solution. The solid is recovered, washed, and dried to yield a polymer which softens slightly at 205°–220° C. and melts at 230°–235° C. This hydrochloride salt of poly[methylene-bis-(1,1'-p-phenylene-5,5'- decamethylenebiguanide)] yields a clear solution when dissolved in water in low concentrations but in high concentrations an opalescent gel is formed. The free base, poly [methylene-bis-(1,1'-p-phenylene-5,5'-decamethylenebiguanide)] may be prepared by treatment of the hydrochloride salt with an equivalent amount of sodium hydroxide. This linear polymer is an amorphous white solid which is resinous at elevated temperatures.

Example 17

*1,5-di-p-sulfophenylbiguanide*

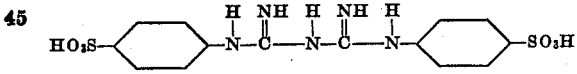

| Reagents | Molar Ratio |
|---|---|
| Calcium dicyanimide | 0.45 |
| Sulfanilic acid | 1.00 |
| Water | 35.00 |

The calcium dicyanimide is dissolved in the water, and the sulfanilic acid is carefully added to this agitated mixture while the temperature is raised from 60° to about 100° C. The reaction mixture remains a clear solution and it is refluxed for about an hour. The reaction mixture is cooled to about 50° C. and acidified with dilute hydrochloric acid. The free material, 1,5-di-p-sulfophenylbiguanide, is thus precipitated from the aqueous solution containing the soluble calcium salt. This colorless solid is recovered, washed, and dried.

Example 18

*1,5-dimethyl-1,5-diphenylbiguanide*

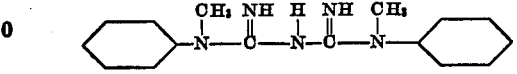

| Reagents | Molar Ratio |
|---|---|
| Calcium dicyanimide | 0.45 |
| Methylaniline | 1.00 |
| Hydrochloric acid, conc | 1.00 |
| Water | 33.00 |

The methylaniline, hydrochloric acid, and about 40% of the above amount of water are carefully mixed to form an aqueous solution of methylaniline hydrochloride. The calcium dicyanimide dissolved in the remaining amount of water is carefully added to the aqueous amine hydrochloride at 90°–100° C. This agitated mixture is heated for about an hour after the addition of the calcium dicyanimide solution is completed. This solution is acidified, and after standing, crystals of 1,5-dimethyl-1,5-diphenylbiguanide hydrochloride separate. This material is filtered, washed, and dried. It decomposes at 209°–210° C., and becomes a clear liquid at 215° C. This material forms a hydrate which loses its water of crystallization slightly below 100° C. and even lower if it is dehydrated under vacuum. The free base is obtained by treating the hydrochloride with aqueous sodium hydroxide.

EXAMPLE 19

1,5-di-β-naphthylbiguanide

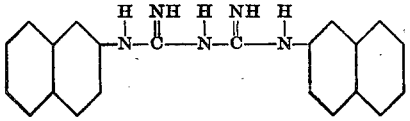

| Reagents | Molar Ratio |
|---|---|
| Sodium dicyanimide | 1.0 |
| β-Naphthylamine | 2.0 |
| Hydrochloric acid, 10% | 2.0 |
| Water | 13.9 |
| 2-Ethoxyethanol-1 | 13.0 |

The sodium dicyanimide and β-naphthylamine are mixed in the aqueous 2-ethoxyethanol-1, and this mixture is agitated and heated to substantially 95°–100° C. The dilute hydrochloric acid is carefully added, and a precipitate soon appears in the original clear solution. After a total of 1–2 hours heating at substantially 95°–100° C., the precipitate is removed from the hot reaction mixture. After washing and drying, the resultant 1,5-di-β-naphthylbiguanide hydrochloride decomposes at 268° C. After the original filtrate is cooled, an additional portion of the hydrochloride salt may be recovered. This salt is insoluble or only slightly soluble in the usual organic solvents and also in hot water. The free base may be prepared from the hydrochloride salt by suspending the latter in ethanol and adding a slight excess of alkali over the theoretical amount required. The free base, 1,5-di-β-naphthylbiguanide is recovered, washed, and dried. It decomposes at 175°–177° C. and is insoluble in water and only slightly soluble in hot ethanol. The acetate salt may be prepared from the above free base, and it is insoluble in hot water but soluble in hot alcohol.

The various examples that are included above are not to be considered as restrictive on the present invention. They are typical of the wide variety of substituted biguanides that may be prepared by the method of this invention.

The substituted biguanides of the present invention are valuable chemicals useful as intermediates in the preparation of chemotherapeutic agents, pharmaceuticals, textile agents, dyestuffs, insecticides, rubber chemicals, plastics, resins, and the like.

While the invention has been described with particular reference to specific embodiments, it is to be understood that it is not to be limited thereto but is to be construed broadly and restricted solely by the scope of the appended claims.

What is claimed:

1. As new chemical compounds, the unsymmetrical 1,5-substituted biguanides having the following formula

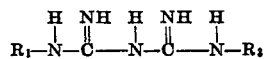

wherein $R_1$ represents an alkyl group and $R_3$ represents an aryl group.

2. As a new chemical compound, 1-dodecyl-5-phenyl biguanide.

DANIEL E. NAGY.

REFERENCES CITED

The following references are of record in the file of this patent:

UNITED STATES PATENTS

| Number | Name | Date |
|---|---|---|
| 1,777,738 | Scott | Oct. 7, 1930 |
| 2,149,709 | Rein | Mar. 7, 1939 |
| 2,223,935 | Daniels et al. | Dec. 3, 1940 |
| 2,258,321 | Ericks | Oct. 7, 1941 |
| 2,265,944 | Langhorst | Dec. 9, 1941 |
| 2,274,412 | Hill | Feb. 24, 1942 |
| 2,289,541 | Ericks | July 14, 1942 |
| 2,320,225 | Ericks | May 25, 1943 |
| 2,330,376 | Parker | Sept. 28, 1943 |
| 2,331,377 | D'Alelio | Oct. 12, 1943 |
| 2,350,453 | Ericks | June 6, 1944 |
| 2,371,111 | Sperry | Mar. 6, 1945 |

OTHER REFERENCES

Cohn, J. Prakt. Chemie, vol. 84 (1911), pages 408–415.

Slotta et al., "Berichte deutsche chem. Gesell.," vol. 62 (1929), pp. 1398 to 1403.

Slotta, Ber. Deut. Chem. Ges., vol. 63B (1929), pages 1390–1398.

Beilstein, Handbuch der Org. Chemie, vol. 12, pages 370, 371.

Davey, Report 360, Board for the Coordination of Matarial Studies, page 7, dated March 27, 1945.

Disclaimer 2,455,896.—*Daniel E. Nagy*, Stamford, Conn. 1-ARYL, 5-ALKYL, BIGUANIDES. Patent dated Dec. 7, 1948. Disclaimer filed Aug. 11, 1949, by the assignee, *American Cyanamid Company*.

Hereby disclaims from claim 1 of said patent coverage of all chemical compounds in which the alkyl group does not conform to the formula $C_nH_{2n+1}$, where $n$ is a whole number.

[*Official Gazette Sept. 6, 1949.*]